June 3, 1947.　　　　E. L. MILLER　　　　2,421,709
CENTRIFUGAL MACHINE
Filed April 28, 1944　　　　2 Sheets-Sheet 1

*INVENTOR.*
EDWARD L. MILLER
BY Bruno C. Lechler
ATTORNEY

June 3, 1947.  E. L. MILLER  2,421,709
CENTRIFUGAL MACHINE
Filed April 28, 1944  2 Sheets-Sheet 2

INVENTOR.
EDWARD L. MILLER
BY
Bruno C. Lechler
ATTORNEY

Patented June 3, 1947

2,421,709

UNITED STATES PATENT OFFICE 2,421,709

CENTRIFUGAL MACHINE

Edward L. Miller, Moline, Ill., assignor to American Machine and Metals, Inc., New York, N. Y., a corporation of Delaware Application April 28, 1944, Serial No. 533,115

6 Claims. (Cl. 210—63)

This invention relates to centrifugal machines and more specifically to centrifugal machines provided with a pivoted and gasketed cover.

When the basket of a centrifugal machine, such as of a centrifugal extractor, revolves at high speed in its outer casing, strong air currents are produced in the machine which become loaded with the spray of the mother liquor thrown off from the revolving basket. If the mother liquor is hot, or if the fumes produced are toxic, the top opening of the machine must be closed by a tightly fitting cover in order to protect the operator. For this purpose a cover is ordinarily used which at the side facing the top opening of the machine is equipped with a circular resilient gasket and which is held pressed down by some clamping means. If all fumes are to be sealed off, the gasket must bear tightly against the top surface of the casing all around its circumference. Any part of the length of the gasket wearing out to such an extent as to allow a clearance to exist between that particular portion of the gasket and the surface upon which the gasket is supposed to rest will exclude the whole gasket from further use in those cases in which even small quantities of fumes leaking out of the machine might prove harmful or even deadly to the operator, such as in the fabrication of poison gas.

The covers of many types of centrifugal machines are quite heavy and to facilitate the operation of the cover it has been found convenient to pivot the cover along one edge arranged more or less tangentially to the top opening of the machine. In order to secure the tight closure of the gasket all around the top opening of the machine, it has been necessary to place the pivot hinge so close to the surface of the top of the machine that the adjacent edge of the gasket is compressed by said pivot when the cover is closed. While such hinged covers as hitherto used provide the perfect seal desired as long as the gasket has undergone only little use, they are unable to maintain such good sealing properties for an extended length of use. The reason is that when the cover is lifted, the just mentioned part of the gasket adjacent to the hinge shaft must perform on its seat a sliding movement under pressure over some distance and is thus subject to severe friction. It is only after the cover has been lifted an appreciable amount that this particular portion of the gasket is relieved from pressure and the consequence is that this particular portion of the gasket rapidly wears off and permits escape of toxic fumes at this spot.

It is an object of this invention to provide a centrifugal machine having a hinged gasketed cover in which those portions of the gasket which are close to the hinge are subjected to substantially only the same wear as the other portions of the gasket.

Another object of the invention is to provide a centrifugal machine having a hinged gasketed cover wherein upon loosening of the clamps for the cover the gasket is relieved from pressure all around its length, and, therefore, no sliding under pressure of the gasket on its seat will occur.

Another object of the invention is to provide a centrifugal machine having a hinged gasketed cover in which the axis about which the cover is turnable for its opening and closing may carry out a limited movement towards or away from the stationary casing of the machine.

A further object of the invention is to provide a centrifugal machine having a hinged gasketed cover in which the hinge has a limited vertical movement so that when the cover turns about its pivot the latter is farther removed from the casing of the machine than when the cover is clamped in place.

Another object of the invention is to provide a cover for centrifugal machines which is pivoted upon two parallel axes each of which takes a portion of the angular opening movement of the cover.

A further object of the invention is to provide a centrifugal machine having a hinged gasketed cover in which the axis about which the cover is turnable for its opening and closing is so connected to a pivot mounted parallel thereto on a stationary part of the machine that said axis may perform a limited angular movement about said pivot.

Many types of centrifugal machines have their covers interlocked with the drive for the machine, such as a motor, in such a manner that whenever the cover is opened the drive is immediately stopped. In the case of a centrifugal machine being driven by an electric motor this safety interlock includes a switch placed in the motor control circuit so that when the hinged cover is opened the motor circuit is cut off. The switch usually comprises a switch lever, which is actuatable by a cam or the like, fixed to the rotatable hinge shaft. In the covers of the prior art this hinge shaft has its axis fixed with relation to the stationary parts of the machine. In the case of the instant invention, however, the axis about which the cover revolves is mounted for a limited movement away from or towards the stationary casing; in the conventional type of centrifugals wherein the opening of the casing is provided in the top plate of the latter this means a movement of said axis in a substantially vertical plane. It is, therefore, a further object of this invention to provide in a centrifugal machine having a hinged gasketed cover whose hinge is movable within limits from or towards the stationary casing, a safety interlock between the cover and the drive whose proper functioning is not affected by the mentioned change of position of the hinge shaft.

A further object of the invention is to provide a centrifugal machine having a pivoted and gasketed cover and a safety interlock between the hinge shaft of the cover displaceable parallel to itself and the motor driving the machine, part of this interlock being formed by a switch actuating cam on the shaft, said cam having an active surface which, when the cover is closed, extends substantially parallel to the direction in which said shaft is displaceable.

Other objects and advantages of the invention will appear as the description proceeds, reference being had to the accompanying drawing, in which.

Figure 3:
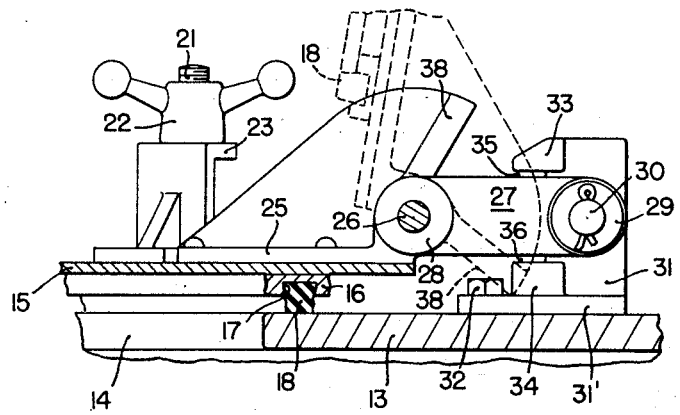
Fig. 3 is a section on line 3—3 in Fig. 2.

10 denotes a stationary casing and 11 a rotatable basket of a centrifugal machine, such as a centrifugal extractor. The basket 11 is shown as driven by an electro-motor 12. 13 is the top plate of the casing 10 having a central opening 14 adapted to be closed by a cover 15. The cover 15 carries near its front end a handle 37 and at its under side a circular ring 16 having a groove 17. Into the groove 17 fits a gasket 18 made of some suitable resilient material, such as soft rubber. Surrounding the central opening 14 and attached to the top plate 13 of the casing 10 are a number of fittings 19 each carrying a pivot about which an eye-bolt 21 equipped with a wing nut 22 may be swung. A bracket 24 fastened to the cover 15 and having a fork-shaped end portion 23 is provided for each bolt 21, the arrangement being such that when the cover 15 is closed and the eye bolts 21 are swung into the position shown in the drawing, the nuts 22 of these bolts are situated each above the forked end portion 23 of the corresponding bracket 24. In this position of the parts the nuts 22 can be screwed down tightly upon the forked parts 23 so as to clamp down the cover 15 and compress the resilient gasket 18 which will thus effectively seal off the opening 14.

Figure 2:
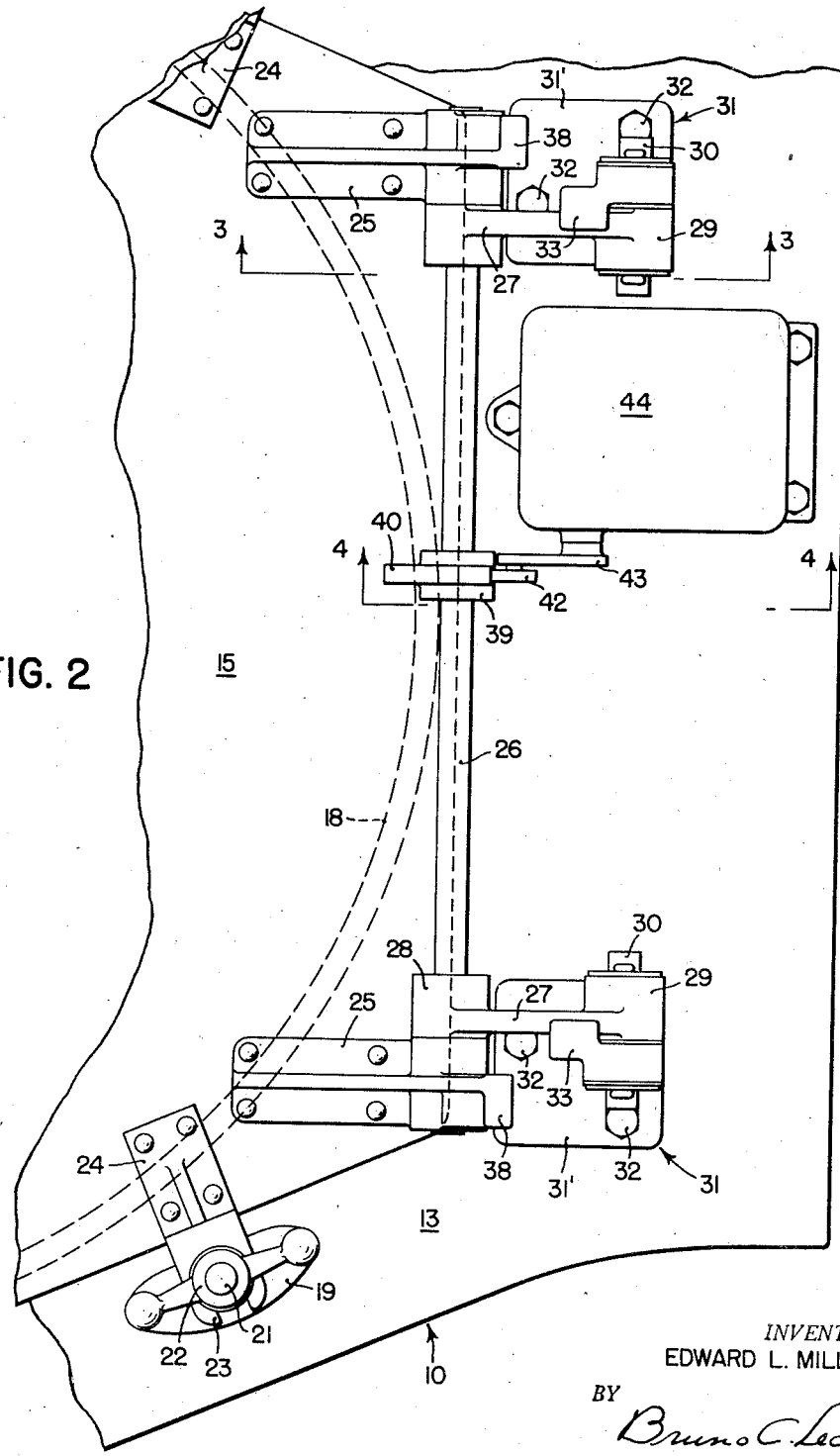
Fig. 2 is a plan view on a larger scale of the cover hinge and parts cooperating therewith.

The cover 15 carries two hinge castings 25 which are pinned to a hinge shaft 26 which lies a little outside the circular gasket 18 as seen from the top (Fig. 2). The shaft 26 is turnably supported in bearings 28 each forming one end of a number of links 27, each link having its other end 29 pivoted at 30 in a support 31. The supports 31 are secured to the top plate 13 of the casing 10, as by bolts 32. The links 27 may turn about their pivots 30 within relatively narrow limits determined by two stops 33 and 34 situated respectively above and below each link 27. The stops 33, 34 are spaced from each other a sufficient distance to leave a small space above as well as below the links 27 when the cover 15 is clamped down by means of the nuts 22.

When the cover 15 is released by loosening the nuts 22 and swinging the eye bolts 21 clear of the forks 23, the cover is able to swing, within limits, about either the axis of the hinge shaft 26 or the axis of the co-axial pivots 30. First, under the action of the expanding gasket 18, the whole cover 15 will move upwardly a short distance carrying with it the hinge shaft 26 and the links 27, turning the latter slightly about their pivots 30 and reducing thereby the spaces 35. Upon lifting now the cover 15 by means of its handle 37 the cover 15 will revolve about the shaft 26. At the start of this revolving movement the shaft 26 will have the tendency to sink, so that that part of the gasket 18 which is closest to the shaft 36 will remain for a short while in contact with the top plate 13 of the casing 10 while the remainder of the gasket immediately lifts clear. The downward movement of the shaft 26 about the pivots 30 is confined to a very short distance, namely the distance 36 existing between the lower face of the links 27 and the lower stops 34. When the cover 15 has been lifted but a short distance, the hinge shaft 26 has brought down the links 27 far enough to take a bearing on the stops 34 from which moment onward a further settlement of the shaft 26 is prevented and now the rear edge also of the gasket 18 swings clear. Thus the whole gasket is relieved from pressure practically immediately from the beginning of the revolving opening movement of the cover 15. In particular, there is no sliding under pressure of the gasket on the casing as is encountered with the covers of centrifugal machines of the prior art. Instead, the hinge shaft 26 performs a limited movement to and from the top plate of the casing, the revolving opening movement of the cover 15 about the axis of the shaft 26 taking place while this shaft is further removed from the top of the casing 10 than it was when the cover 15 was clamped in place. In this position of the shaft 26 the links 27 are in contact with the upper stops 33 of the supports 31. In the fully open position of the cover 15 in which stops 38 provided on the hinge castings 25 are resting upon the bottom plates 31' of the supports 31, as is shown in dotted lines in Fig. 3, the shaft 26 has again settled down a short distance limited by the stops 34 below the links 27.

Thus the invention provides a means whereby a gasketed cover may be pivoted along a substantially tangential edge in a manner that permits the cover to be tightened uniformly with the same freedom as is possessed by a symmetrical unhinged cover and to be lifted with substantially no frictional wear upon the gasket. To approximate the same condition with the usual hinged cover would require placing the hinge a considerable distance to the right of the tangent.

Figure 4:
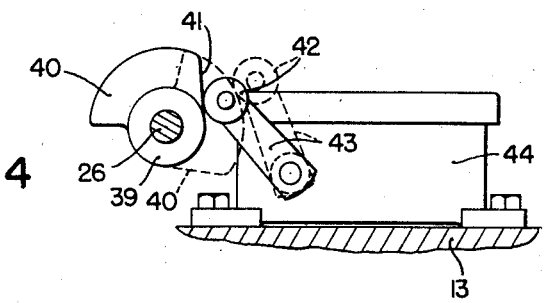
Fig. 4 is a section on line 4—4 in Fig. 2.
Figure 1:
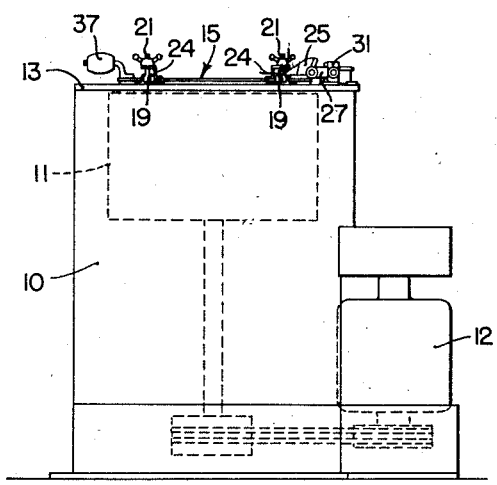
Fig. 1 is a side elevation of a centrifugal machine embodying the invention.

Pinned to the shaft 26 by means of a hub 39 is a cam 40 having an active surface 41 which in the closed position of the cover 15 extends substantially vertically, that is substantially parallel to the direction in which the shaft 26 is permitted to move relative to the top 13 of the casing 10. Against the surface 41 of the cam 40 rests a roller 42 carried by a lever 43 adapted to operate a switch 44. This switch may be of any standard construction and, therefore, needs no description here. Referring to Fig. 4, the switch 44 is in its on-position when the switch lever 43 with the roller 42 is in the position shown in full lines, and in the off-position when the lever 43 has been moved by the cam 40 into the position shown in dotted lines. To bring the switch lever 43 from the full-line position to the dotted-line position, the cover 15 need be lifted only a small amount to turn the cam 40 enough to cause the cam surface 41 to force the roller 42 from the full line to the dotted line position. The further angular opening movement of the shaft 26 necessary to bring the cover to the fully open position corresponding to the position of the cam 40 shown in dotted lines does not further affect the position of the lever 43 since during this part of the movement the roller 42 is riding on the circular surface of the cam 40.

The cam 40 will operate the switch 44 properly in spite of the fact that the shaft 26 on which the cam is mounted undergoes small vertical displacements in the manner described. The amount of such vertical displacements will vary with the condition of the gasket 18, but this factor, too, will not prevent the proper functioning of the interlock, since the active surface 41 of the cam is roughly in the direction in which the links 27 allow the shaft 26 and parts carried thereon to move. As has been stated before, the maximum extent to which the shaft 26 can be displaced vertically is limited by the stops 33 and 34.

It is to be understood that while I have shown in the drawing one particular embodiment of the invention as applied to a directly motor-driven centrifugal extractor, this embodiment has been given as an illustrative example only, since the invention is equally well applicable to centrifugal machines being driven in a different manner, and various changes, rearrangements, and modifications may be made in the details of the construction shown without departing from the spirit of the invention or from the scope of the appended claims.

What I claim is:

1. In a centrifugal extractor, in combination, a casing top having an opening therein, an external cover that is adapted to close said opening, a shaft on which the cover swings, means to clamp the cover when closed to the casing top, links pivoted to the casing top which support the shaft in a manner permitting movement normal to the casing top, stops carried by the casing top limiting the movement of a link to that required to allow the shaft to move far enough away from the casing top to permit the cover to be swung around the shaft to open without dragging on the casing top.

2. In a centrifugal extractor, in combination, a casing top having an opening therein, an external cover that is adapted to close said opening, a shaft on which the cover swings, a gasket between cover and casing top, means to clamp the cover, when closed, to the casing top, links pivoted to the casing top which support the shaft in a manner permitting movement normal to the casing top, stops carried by the casing top limiting the movement of the link to that required to allow the shaft to move far enough away from the casing top to relieve pressure on the gasket and to permit the cover to be swung around the shaft to open position without dragging the gasket on the casing top.

3. In a centrifugal extractor, in combination, a casing top having an opening therein, an external cover that is adapted to close said opening, a shaft on which the cover swings, a gasket between cover and casing top, means to clamp the cover when closed to the casing top, links pivoted to the casing top which support the shaft in a manner permitting movement normal to the casing top, a stop carried by the casing top limiting the movement of the link to that required to allow the shaft to move far enough away from the casing top to relieve pressure on the gasket and to permit the cover to be swung around the shaft to open position without dragging the gasket on the casing top, a second stop engaging the link to limit the approach of the shaft and the edge of the cover under the weight of the cover in open position toward the casing top.

4. In a centrifugal extractor, in combination, a casing top having an opening therein, an external cover that is adapted to close said opening, a shaft on which the cover swings, an electric switch responsive to the opening of the cover, links pivoted to the casing top which support the shaft in a manner permitting movement normal to the casing top, a stop carried by the casing top limiting the movement of a link to that required to allow the shaft to move far enough away from the casing top to permit the cover to be swung around the shaft to open position without dragging, a cam on said shaft moving with the cover and coacting with said switch, the engaging face of said cam being normal to the link axis when the cover is closed.

5. In a centrifugal extractor, in combination, a casing top having an opening therein, an external cover that is adapted to close said opening, a shaft on which the cover swings, a gasket between cover and casing top, means to clamp the cover when closed to the casing top, an electric switch responsive to the opening of the cover, links pivoted to the casing top which support the shaft in a manner permitting movement normal to the casing top, a stop carried by the casing top limiting the movement of the link to that required to allow the shaft to move far enough away from the casing top to relieve pressure on the gasket and to permit the cover to be swung around the shaft to open position without dragging the gasket on the casing top, a cam on said shaft moving with the cover and coacting with said switch, the engaging face of said cam being normal to the link axis when the cover is closed.

6. In combination, a casing having an opening in the top thereof, a pin supported by the casing, a link carried by the pin, a cover hinged to the link, an abutment carried by the casing adapted to engage the link as the weight of the cover acting on the hinge in opening the cover drops the hinge, thus limiting the dragging of the edge of the cover along the casing, a stop carried by the cover engaging the casing when the cover has been opened past the vertical, a lug carried by the casing adapted to engage the link to limit the lifting of the hinge by the weight of the cover acting about the stop as a fulcrum.

EDWARD L. MILLER.

REFERENCES CITED

The following references are of record in the file of this patent:

UNITED STATES PATENTS

| Number | Name | Date |
| --- | --- | --- |
| 2,223,098 | Martin et al. | Dec. 3, 1940 |
| 791,779 | Heiser | June 6, 1905 |
| 2,105,248 | Johnson | Jan. 11, 1938 |
| 1,470,429 | Dunbar | Oct. 9, 1923 |
| 1,224,888 | Balzer | May 8, 1917 |
| 2,261,936 | Johnson | Nov. 11, 1941 |

FOREIGN PATENTS

| Number | Country | Date |
| --- | --- | --- |
| 4,183 | Great Britain | 1909 |